(12) United States Patent
Hashimoto

(10) Patent No.: US 11,958,228 B2
(45) Date of Patent: Apr. 16, 2024

(54) RUBBER MEMBER MOLDING METHOD

(71) Applicant: Toyo Tire Corporation, Itami (JP)

(72) Inventor: Yoshiki Hashimoto, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

(21) Appl. No.: 17/859,105

(22) Filed: Jul. 7, 2022

(65) Prior Publication Data

US 2023/0035931 A1    Feb. 2, 2023

(30) Foreign Application Priority Data

Jul. 27, 2021   (JP) .................................. 2021-122111

(51) Int. Cl.
| | |
|---|---|
| *B29C 48/92* | (2019.01) |
| *B29C 48/00* | (2019.01) |
| *B29C 48/30* | (2019.01) |
| *B29C 48/35* | (2019.01) |
| *B29K 21/00* | (2006.01) |
| *B29L 29/00* | (2006.01) |

(52) U.S. Cl.
CPC .......... *B29C 48/92* (2019.02); *B29C 48/0019* (2019.02); *B29C 48/022* (2019.02); *B29C 48/303* (2019.02); *B29C 48/35* (2019.02); *B29C 2948/92152* (2019.02); *B29C 2948/92447* (2019.02); *B29C 2948/92647* (2019.02); *B29C 2948/92942* (2019.02); *B29K 2021/00* (2013.01); *B29L 2029/00* (2013.01)

(58) Field of Classification Search
CPC ... B29C 41/26; B29C 48/2665; B29C 48/266; B29C 48/92
See application file for complete search history.

(56) References Cited

U.S. PATENT DOCUMENTS

| | | | | |
|---|---|---|---|---|
| 3,647,346 A | * | 3/1972 | Minnie .................... | B29C 48/08 264/176.1 |
| 3,871,810 A | * | 3/1975 | Geyer ..................... | B29C 48/92 425/374 |
| 5,928,679 A | * | 7/1999 | Ohki ....................... | B29C 48/49 425/374 |
| 6,821,106 B1 | * | 11/2004 | Looman, Jr. ............ | B29C 48/07 425/325 |
| 9,085,104 B2 | * | 7/2015 | Ulcej ...................... | B29C 48/07 |
| 10,350,805 B2 | * | 7/2019 | Monnereau ........... | B29C 48/395 |
| 10,493,681 B2 | * | 12/2019 | Herbing .................. | B29B 7/728 |

(Continued)

FOREIGN PATENT DOCUMENTS

JP    2020-185760 A    11/2020

*Primary Examiner* — Benjamin A Schiffman

(74) *Attorney, Agent, or Firm* — WHDA, LLP

(57) ABSTRACT

A rubber member molding method for molding a rubber member having a belt shape by attaching rubber discharged from a die to a molding surface while relatively moving the die and the molding surface in a direction along the molding surface, the rubber member molding method includes setting, as an abutting position, a position where a first one of the die and the molding surface is moved in a direction of moving closer to a second one and abuts on the second one before start of molding, and setting, as a molding start position, a position where the first one is moved from the abutting position in a direction of moving away from the second one by a desired thickness of a rubber member at the start of molding.

5 Claims, 7 Drawing Sheets

(56) References Cited

U.S. PATENT DOCUMENTS

| | | | |
|---|---|---|---|
| 10,661,504 B2 * | 5/2020 | Albert | B29C 64/106 |
| 11,123,938 B2 * | 9/2021 | Hashimoto | B29D 30/50 |
| 11,130,302 B2 * | 9/2021 | Hashimoto | B29D 30/48 |
| 2017/0297285 A1 * | 10/2017 | Hashimoto | B29D 30/50 |
| 2022/0184870 A1 * | 6/2022 | Hashimoto | B29C 48/35 |
| 2022/0184911 A1 * | 6/2022 | Hashimoto | B29D 30/50 |

* cited by examiner

RUBBER MEMBER MOLDING METHOD

BACKGROUND OF THE INVENTION

Field of the Invention

The present disclosure relates to a rubber member molding method, a rubber member molding device, a molding drum, and a program.

Description of the Related Art

There is known a method of molding a belt-shaped rubber member by attaching rubber discharged from a die of an extruder to a molding surface while moving the molding surface (for example, Patent Document 1 below). In this method, the rubber discharged from the die passes through a clearance between the die and the molding surface so that a rubber member having a desired thickness is molded. For this reason, the clearance between the die and the molding surface greatly affects the attaching accuracy and dimension of the rubber member.

Conventionally, the clearance between the die and the molding surface has been manually set. Specifically, the position of the die has been determined by bringing the die close to the molding surface little by little and actually measuring the clearance with a gap gauge or the like. However, when the clearance is actually measured with a gap gauge or the like, variations due to differences between individuals occur, and it has been difficult to set the clearance between the die and the molding surface with high accuracy.

PRIOR ART DOCUMENT

Patent Document

Patent Document 1: JP-A-2020-185760

SUMMARY OF THE INVENTION

An object of the present disclosure is to provide a rubber member molding method, a rubber member molding device, a molding drum, and a program capable of setting a clearance between a die and a molding surface with high accuracy.

A rubber member molding method of the present disclosure is a rubber member molding method for molding a rubber member having a belt shape by attaching rubber discharged from a die to a molding surface while relatively moving the die and the molding surface in a direction along the molding surface, the rubber member molding method includes setting, as an abutting position, a position where a first one of the die and the molding surface is moved in a direction of moving closer to a second one and abuts on the second one before start of molding, and setting, as a molding start position, a position where the first one is moved from the abutting position in a direction of moving away from the second one by a desired thickness of a rubber member at the start of molding.

DETAILED DESCRIPTION OF THE PREFERRED EMBODIMENTS

Figure 1A:
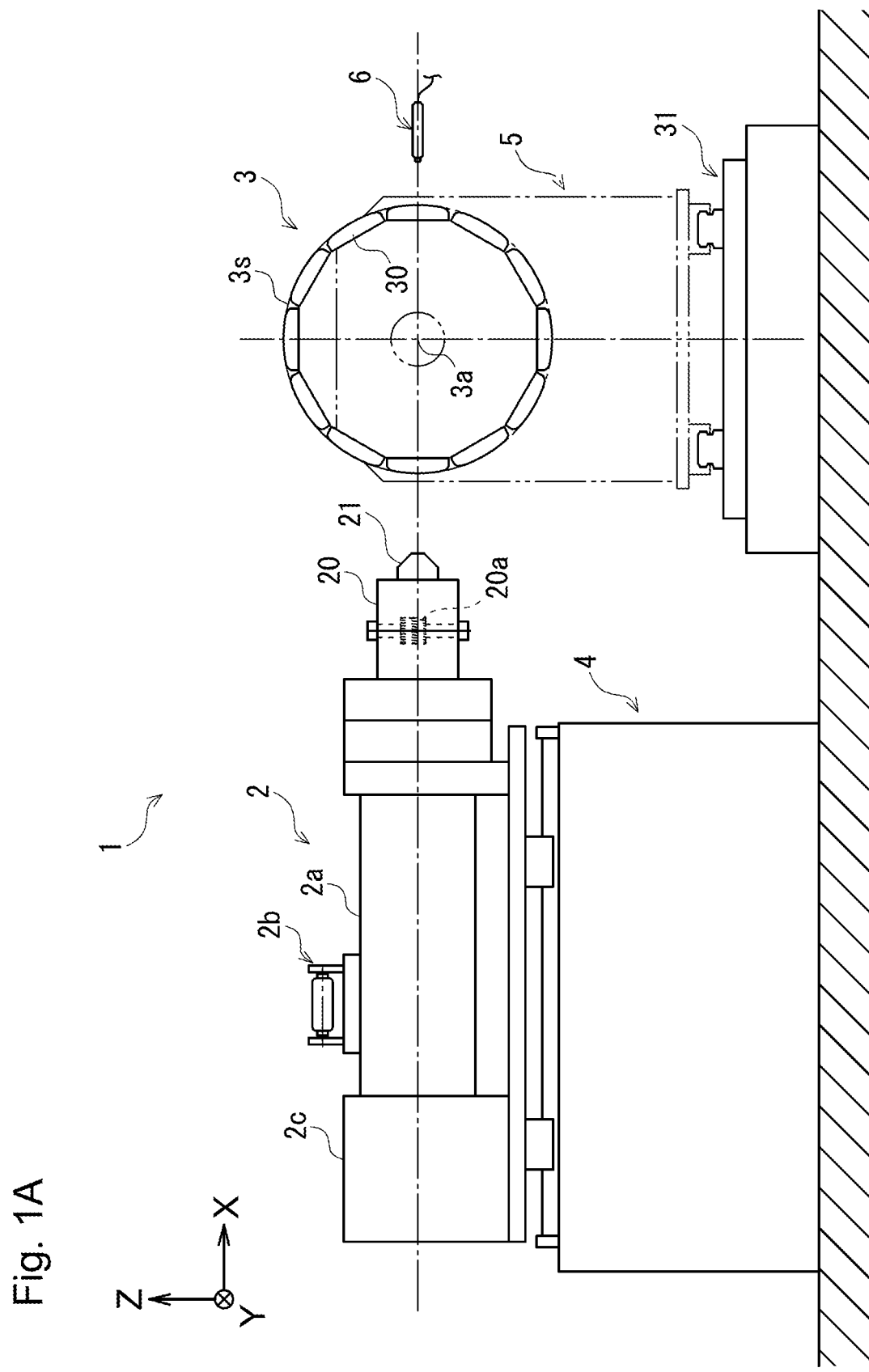
FIG. 1A is a front view schematically illustrating a rubber member molding device of the present embodiment.

Hereinafter, an embodiment of a rubber member molding method and a rubber member molding device will be described with reference to FIGS. 1A to 9. Note that a dimensional ratio of the drawing does not necessarily coincide with an actual dimensional ratio in each of the drawings, and dimensional ratios in the drawings do not necessarily coincide with each other.

<Structure of Rubber Member Molding Device>

Figure 1B:
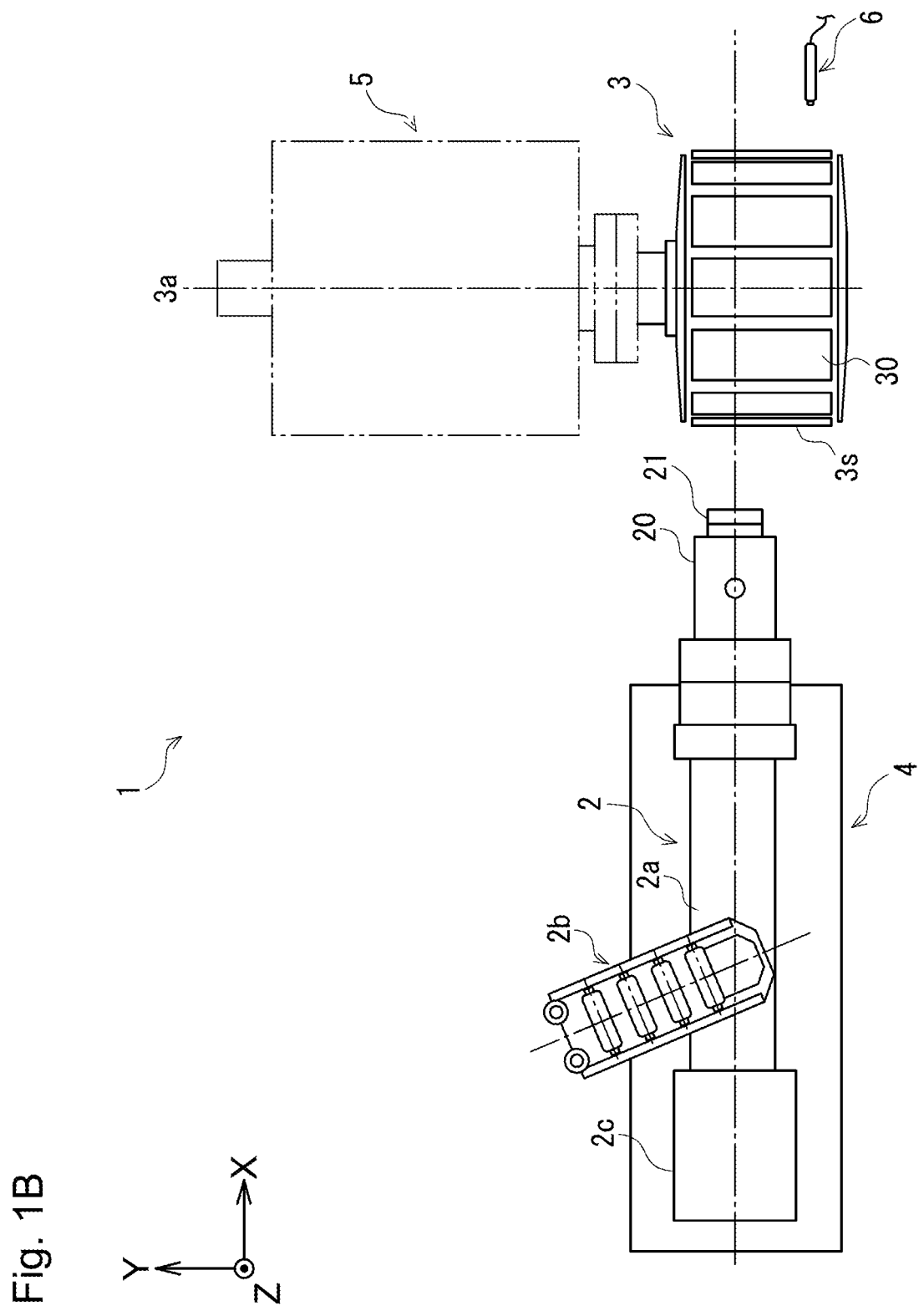
FIG. 1B is a plan view schematically illustrating the rubber member molding device of the present embodiment.
Figure 2:
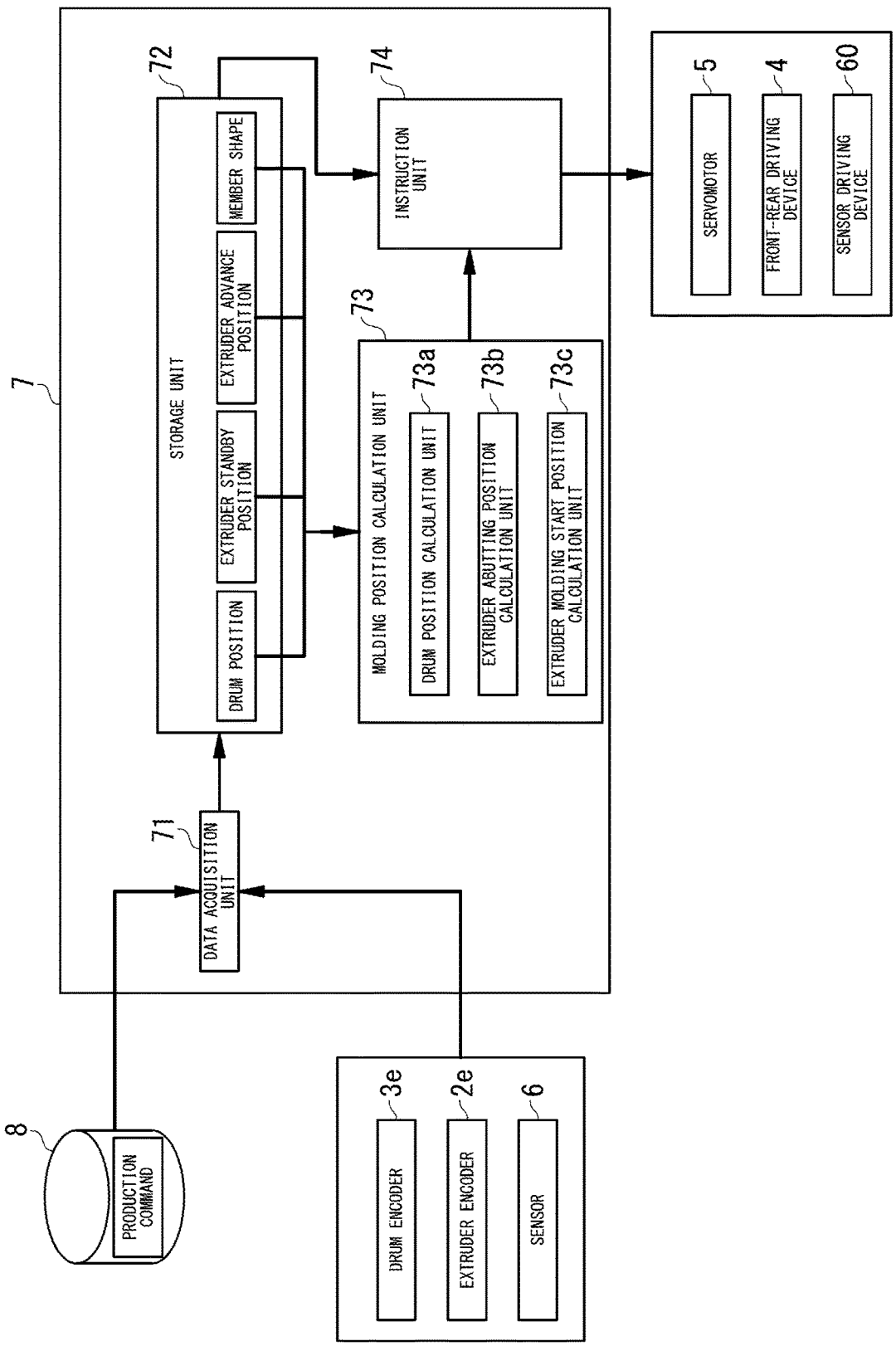
FIG. 2 is a block diagram illustrating a function of a control system of the rubber member molding device.

FIGS. 1A and 1B are schematic views illustrating an example of the rubber member molding device, in which FIG. 1A is a front view and FIG. 1B is a plan view. FIG. 2 is a block diagram illustrating a function of a control system of the rubber member molding device.

As illustrated in FIGS. 1A and 1B, a rubber member molding device 1 includes an extruder 2 that kneads and extrudes rubber toward a die 21, a molding drum 3, a front-rear driving device 4 that drives the extruder 2 forward and backward, a servomotor 5 that rotationally drives the molding drum 3, a sensor 6 that measures displacement of the molding drum 3, and a control device 7 (not illustrated in FIGS. 1A and 1B).

In description below, as illustrated in FIGS. 1A and 1B, an extrusion direction of rubber by the extruder 2 is defined as an X direction, a cylindrical axis direction of the molding drum 3 having a cylindrical shape is defined as a Y direction, and a direction orthogonal to the X direction and the Y direction is defined as a Z direction. In expressing the directions, in a case where the positive and negative directions are distinguished from each other, the positive and negative signs are attached, such as "+X direction" and "−X direction", and in a case where the directions are expressed without distinguishing the positive and negative directions, the directions are simply described as "X direction".

The extruder 2 includes a barrel 2a having a tubular shape, a hopper 2b connected to a supply port of the barrel 2a, a screw (not illustrated) that kneads rubber in the barrel 2a and feeds the rubber to the tip side (+X direction side), and a screw motor 2c that rotationally drives the screw. Operation of the screw motor 2c is controlled by the control device 7.

A gear pump 20 that feeds rubber supplied from the extruder 2 to the die 21 is connected to the tip side of the extruder 2. The gear pump 20 feeds a fixed amount of rubber toward the die 21 connected to the tip side of the gear pump 20. The gear pump 20 incorporates a pair of gears 20a rotationally driven by a gear motor (not illustrated). Operation of the gear motor is controlled by the control device 7.

Rubber is extruded at a predetermined discharge amount via the gear pump 20 and the die 21.

The extruder 2 is configured to be movable forward and backward in the extrusion direction (X direction) by the front-rear driving device 4. The extruder 2 moves closer to the molding drum 3 by moving forward and moves away from the molding drum 3 by moving backward. The gear pump 20 and the die 21 connected to the extruder 2 move forward and backward integrally with the extruder 2. The front-rear driving device 4 corresponds to a moving mechanism of the present disclosure. Operation of the front-rear driving device 4 is controlled by the control device 7.

The molding drum 3 has a plurality of segments 30 arranged along a circumferential direction to form a molding surface 3s having a cylindrical shape. In the present embodiment, an example in which the molding drum 3 has 12 of the segments 30 is shown. The number of the segments 30 is not limited to this, and may be, for example, six or eight. Each of the segments 30 is formed in a plate shape curved in an arc shape when viewed from a cylindrical axis direction of the molding drum 3.

Each of the segments 30 is displaced in a radial direction by a cylinder device (not illustrated). In this manner, the molding drum 3 is configured to be able to expand and contract according to the displacement of the segment 30. Such a segment structure of the molding drum 3 is conventionally publicly-known, and is disclosed in, for example, JP-A-2004-358680.

The molding drum 3 is configured to be rotatable about a cylindrical axis 3a by the servomotor 5. The molding drum 3 is cantilevered by the servomotor 5. However, in order to prevent unnecessary displacement of the molding drum 3 during molding, the cylindrical axis 3a of the molding drum 3 on the side opposite to the servomotor 5 is fixed by a tail stock (not illustrated) during molding. Operation of the servomotor 5 is controlled by the control device 7. Rubber discharged from the die 21 is wound around the molding surface 3s of the molding drum 3. The molding drum 3 is configured to be able to swing (reciprocate) in the cylindrical axis direction (Y direction) by a swing driving device 31 (see FIG. 1A) together with the servomotor 5. Operation of the swing driving device 31 is controlled by the control device 7. By swinging the molding drum 3 relative to the extruder 2 while rotating the molding drum 3, it is possible to wind rubber in a spiral shape along the circumferential direction, and mold an annular rubber member having a desired cross-sectional shape. The annular rubber member can also be molded by winding rubber around the rotating molding drum 3 only by one turn without swinging the molding drum 3 with respect to the extruder 2.

The sensor 6 measures displacement of the molding drum 3. As described above, since the molding drum 3 is cantilevered by the servomotor 5, a minute displacement occurs due to an external force. The sensor 6 may measure this minute displacement of the molding drum 3. A type of the sensor 6 is not particularly limited, and may be a laser displacement meter or a profile measuring instrument, but a contact sensor is preferable.

The sensor 6 is arranged on the opposite side of the extruder 2 across the molding drum 3. The sensor 6, the cylindrical axis 3a of the molding drum 3, and the die 21 are arranged on a straight line when viewed from the cylindrical axis direction of the molding drum 3. In other words, when viewed from the cylindrical axis direction of the molding drum 3, the sensor 6 is arranged on an extension line in a direction in which the die 21 moves closer to the molding surface 3s of the molding drum 3 (specifically, on a straight line passing through the die 21 and the cylindrical axis 3a). As illustrated in FIG. 1B, the sensor 6 is arranged to face the −Y direction side of the molding drum 3. According to this configuration, since the molding drum 3 is cantilevered on the +Y direction side and displacement on the −Y direction side becomes large, it is easy to measure a minute displacement of the molding drum 3 with the sensor 6.

The sensor 6 is configured to be movable forward and backward in the extrusion direction (X direction) of the extruder 2 by a sensor driving device 60 (see FIG. 2). The sensor 6 moves closer to the molding drum 3 by moving forward and moves away from the molding drum 3 by retracting. Operation of the sensor driving device 60 is controlled by the control device 7.

The control device 7 controls operation of the front-rear driving device 4, the servomotor 5, the sensor driving device 60, and the like on the basis of a production command transmitted from a production management unit 8 illustrated in FIG. 2. Although not illustrated in FIG. 2, the control device 7 also controls operation of the screw motor 2c of the extruder 2 and the gear motor of the gear pump 20. The control device 7 includes a data acquisition unit 71, a storage unit 72, a molding position calculation unit 73, and an instruction unit 74.

The data acquisition unit 71 receives a production command from the production management unit 8. Further, the data acquisition unit 71 acquires measurement data of a drum encoder 3e, an extruder encoder 2e, and the sensor 6. The drum encoder 3e measures displacement of the molding drum 3 by the servomotor 5, and outputs position information as an electric signal. The extruder encoder 2e measures displacement of the extruder 2 by the front-rear driving device 4, and outputs position information as an electric signal.

The storage unit 72 stores a drum position (described later), an extruder standby position (described later), an extruder advance position (described later), and a member shape. The member shape is data related to a shape of a rubber member to be molded.

The molding position calculation unit 73 includes a drum position calculation unit 73a, an extruder abutting position calculation unit 73b, and an extruder molding start position calculation unit 73c. The drum position calculation unit 73a calculates a position of the molding drum 3. The position of the molding drum 3 includes a position in a cylindrical axis direction (Y direction) of the molding drum 3 and a position in a rotation direction (circumferential direction) of the molding drum 3. The extruder abutting position calculation unit 73b calculates a position (abutting position) of the extruder 2 when the extruder 2 and the molding drum 3, specifically, the die 21 and the molding surface 3s abut on each other. The extruder molding start position calculation unit 73c calculates a position (molding start position) of the extruder 2 when discharge of rubber from the die 21 is started.

The instruction unit 74 transmits an instruction signal to the servomotor 5, the front-rear driving device 4, and the sensor driving device 60 based on data calculated by the molding position calculation unit 73 and data stored in the storage unit 72.

<Rubber Member Molding Method>

Figure 3:
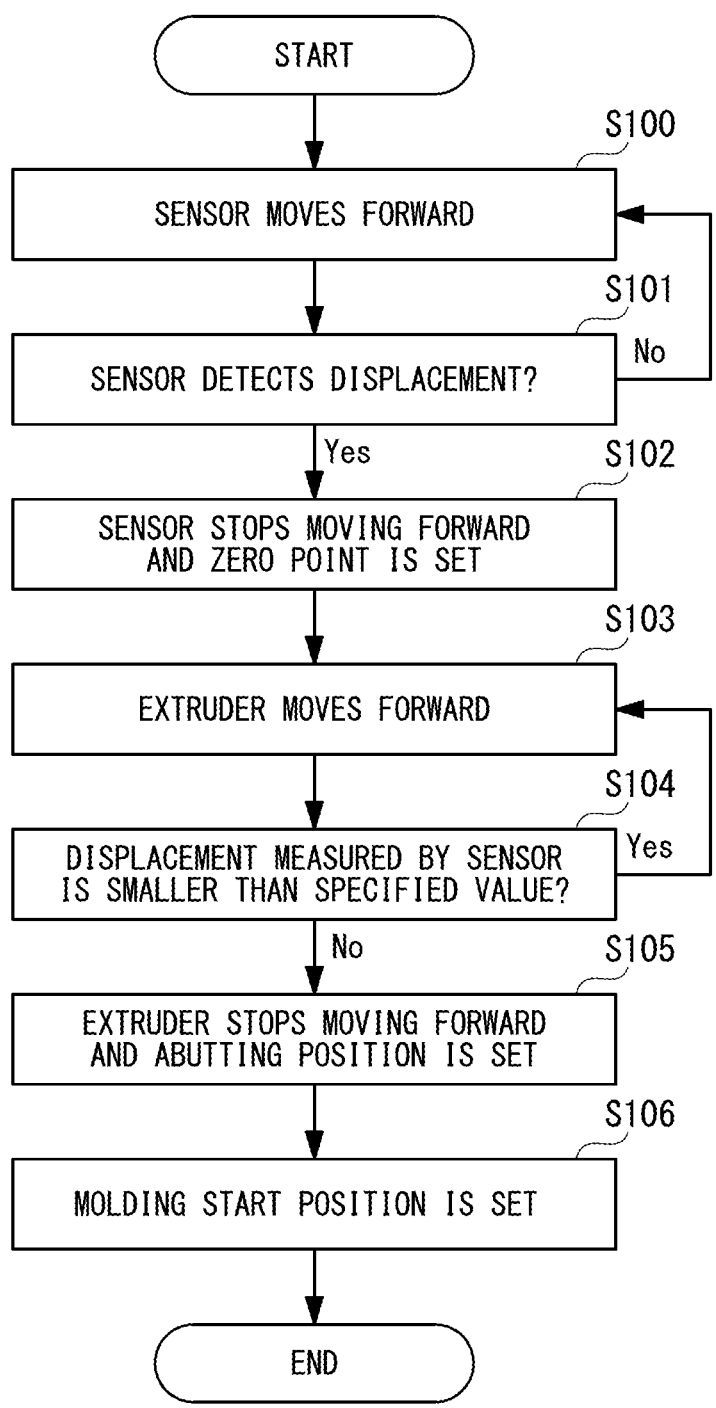
FIG. 3 is a flowchart illustrating an example of a rubber member molding method.

Next, a rubber member molding method will be described with reference to FIGS. 3 to 9. FIG. 3 is a flowchart illustrating an example of the rubber member molding method. FIGS. 4 to 9 are diagrams illustrating a positional relationship between the extruder 2, the molding drum 3, and the sensor 6 during execution of the rubber member molding method.

Figure 4:
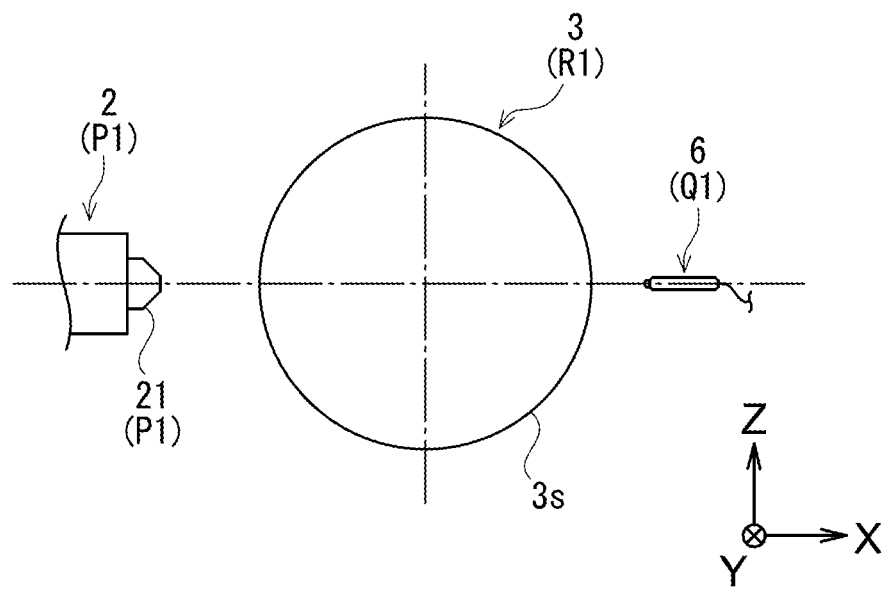
FIG. 4 is a diagram illustrating a positional relationship between an extruder, a molding drum, and a sensor.

FIG. 4 illustrates a positional relationship between the extruder 2, the molding drum 3, and the sensor 6 before the start of molding. The extruder 2 and the die 21 are at a standby position P1. The standby position P1 is stored in advance in the storage unit 72 as position information from the extruder encoder 2e. The sensor 6 is also at a standby position Q1 away from the molding drum 3.

The molding drum 3 is moved in the cylindrical axis direction (Y direction) by the swing driving device 31, and is stopped at a stop position R1 facing the die 21 of the extruder 2. The stop position R1 of the molding drum 3 is calculated by the drum position calculation unit 73a. A signal indicating that the molding drum 3 is stopped is transmitted to the control device 7.

First, in step S100, the sensor 6 is moved forward from the standby position Q1 by the sensor driving device 60. The sensor 6 continues to move forward until a tip comes into contact with the molding surface 3s of the molding drum 3.

Next, in step S101, it is determined whether or not the sensor 6 detects displacement. The sensor 6 detects displacement when coming into contact with the molding surface 3s. In a case where the sensor 6 does not detect displacement (No in step S101), that is, in a case where the sensor 6 is not yet in contact with the molding surface 3s, the sensor 6 returns to step S101 and continues to move forward.

Figure 5:
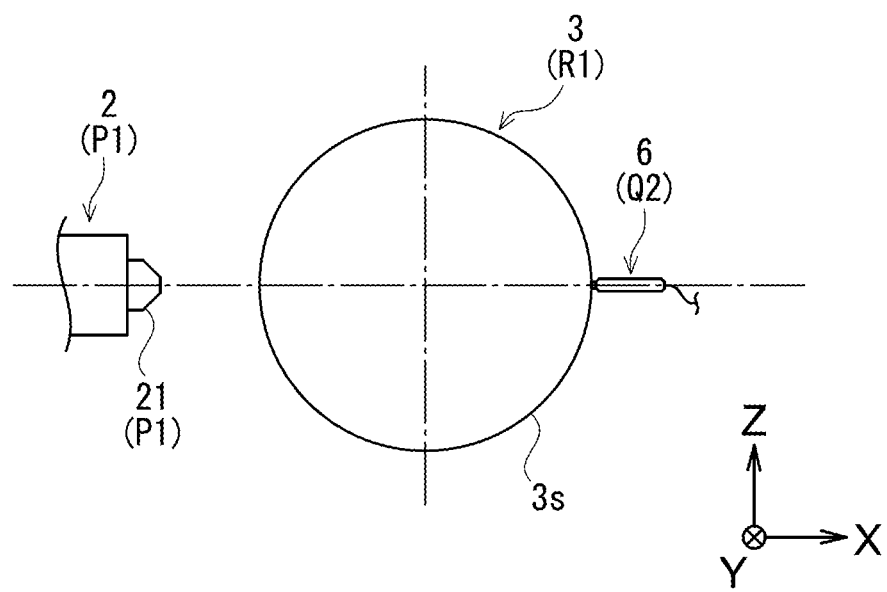
FIG. 5 is a diagram illustrating a positional relationship between the extruder, the molding drum, and the sensor.
Figure 6:
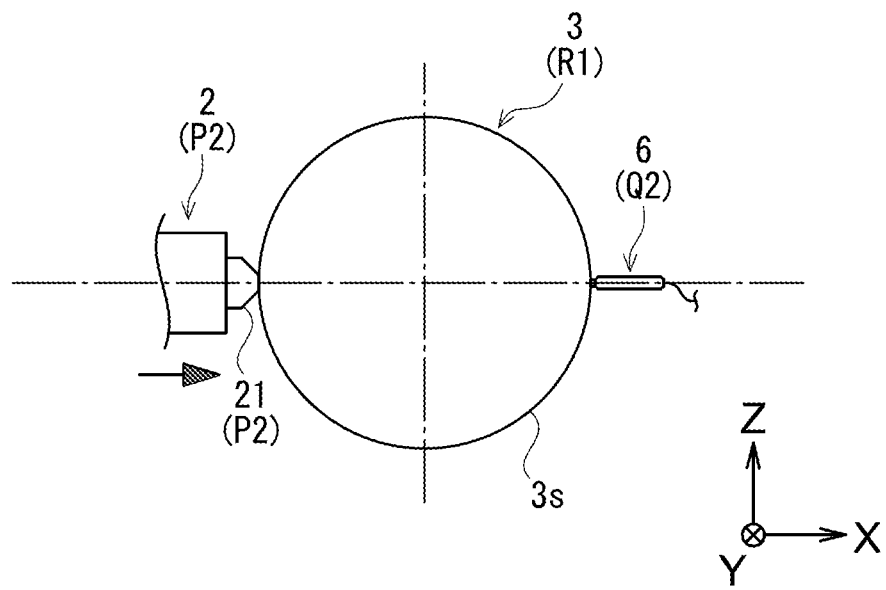
FIG. 6 is a diagram illustrating a positional relationship between the extruder, the molding drum, and the sensor.
Figure 7:
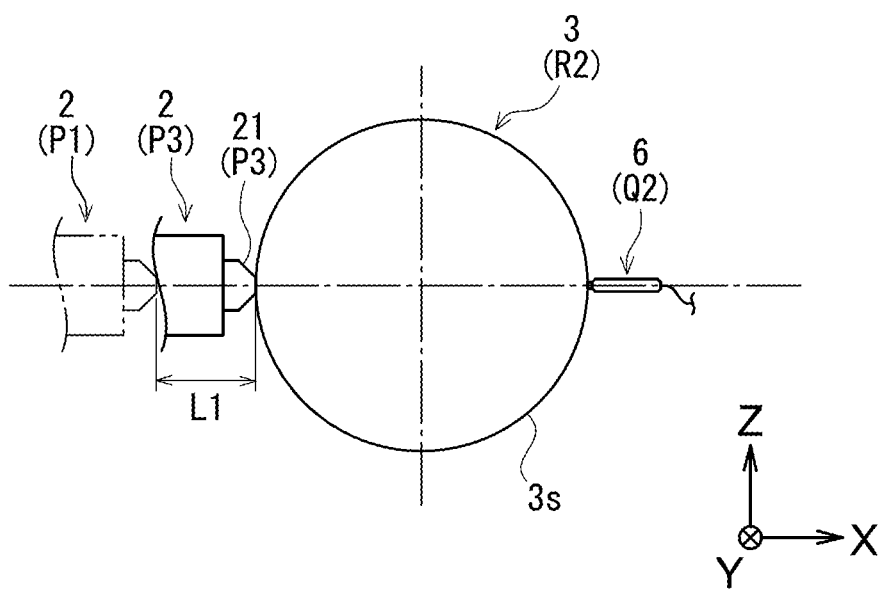
FIG. 7 is a diagram illustrating a positional relationship between the extruder, the molding drum, and the sensor.

In contrast, in a case where the sensor 6 detects displacement (Yes in step S101), that is, in a case where a tip of the sensor 6 comes into contact with the molding surface 3s as illustrated in FIG. 5, the sensor 6 stops in step S102. The storage unit 72 stores a stop position Q2 of the sensor 6. A detection value of the sensor 6 at the stop position Q2 is set to a zero point of the sensor 6.

Next, in step S103, the extruder 2 is moved forward from the standby position P1 by the front-rear driving device 4. The extruder 2 continues to move forward until the die 21 and the molding surface 3s abut on each other. Whether or not the die 21 and the molding surface 3s abut on each other is determined by displacement of the molding drum 3 from the stop position R1. Specifically, when the die 21 starts to come into contact with the molding surface 3s at a contact start position P2 illustrated in FIG. 6 by forward movement of the extruder 2 and then the die 21 presses the molding drum 3 in the contact state to slightly displace the molding drum 3 from the stop position R1, it is determined that the die 21 and the molding surface 3s abut on each other. In the present embodiment, it is determined that the die 21 and the molding surface 3s abut on each other when the molding drum 3 is displaced by 0.01 mm from the stop position R1.

In step S104, it is determined whether or not the displacement measured by the sensor 6 is smaller than a specified value. The specified value is preferably 0.10 mm or less, and more preferably 0.01 mm or less. In the present embodiment, the specified value is set to 0.01 mm as described above. When the displacement measured by the sensor 6 is smaller than the specified value (Yes in step S104), the extruder 2 returns to step S103 and continues to move forward.

In contrast, in a case where the displacement measured by the sensor 6 reaches the specified value (No in step S104), the extruder 2 stops in step S105. The positions of the extruder 2 and the die 21 at this time are defined as an abutting position P3 illustrated in FIG. 7. Due to the advancement of the extruder 2, the molding drum 3 also slightly moves from the stop position R1 to the abutting position R2. When it is determined that the die 21 and the molding surface 3s abut on each other, an advanced position L1 of the extruder 2 is stored in the storage unit 72. The advanced position L1 is a distance by which the extruder 2 has moved forward from the standby position P1 to the abutting position P3. When the advanced position L1 is stored, the sensor 6 moves backward from the stop position Q2 and returns to the standby position Q1. The abutting position P3 of the extruder 2 is calculated by the extruder abutting position calculation unit 73b based on the standby position P1 and the advanced position L1. Note that the sensor 6 may remain at the stop position Q2 in and after step S106 described later.

Figure 8:
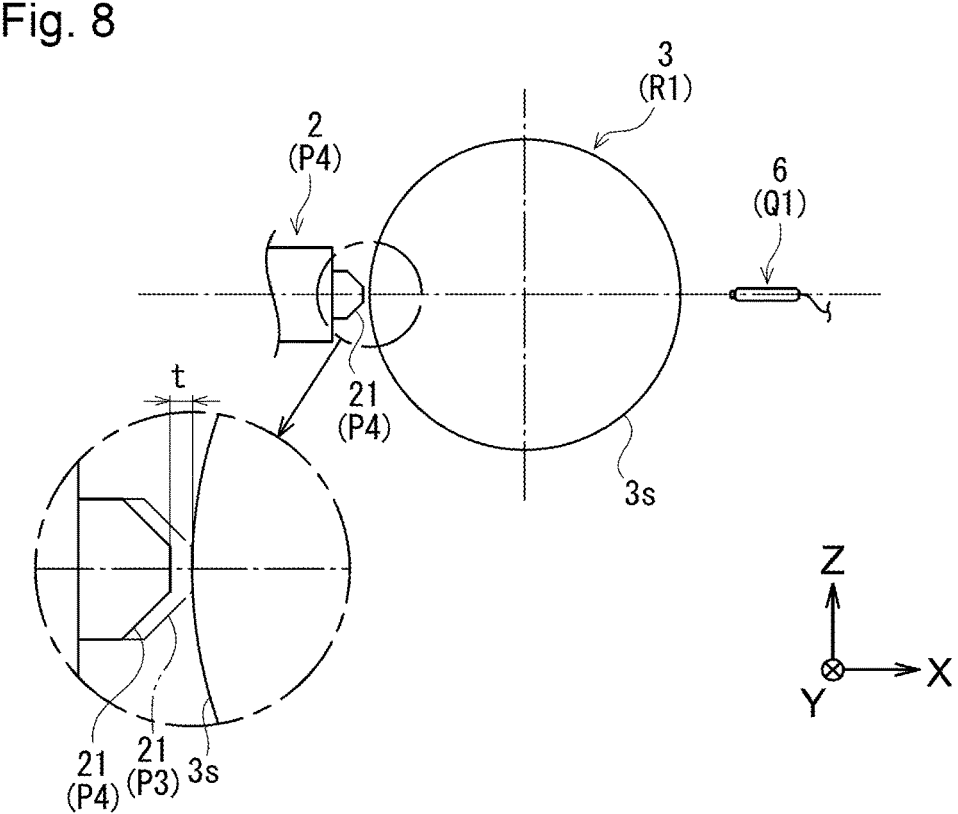
FIG. 8 is a diagram illustrating a positional relationship between the extruder, the molding drum, and the sensor.

Next, in step S106, a molding start position P4 of the extruder 2 is set. The molding start position P4 is a position where rubber discharged from the die 21 starts to be attached to the molding surface 3s. As illustrated in FIG. 8, the molding start position P4 is a position backward from the abutting position P3 as a starting point by a desired thickness t of a rubber member at the start of molding. Data of the desired thickness t of rubber member is stored in the storage unit 72 as one of member shapes. The thickness t of the rubber member is, for example, 0.10 to 0.50 mm. The molding start position P4 is calculated by the extruder molding start position calculation unit 73c based on the abutting position P3 and the thickness t.

Figure 9:
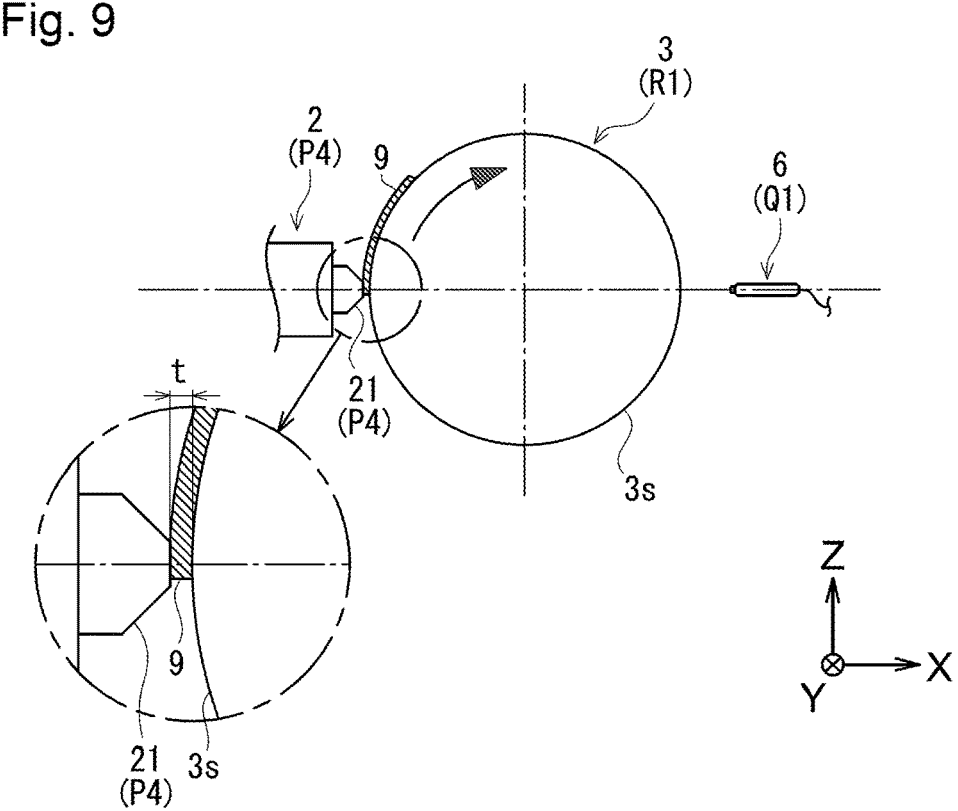
FIG. 9 is a diagram illustrating a positional relationship between the extruder, the molding drum, and the sensor.

After the above, as illustrated in FIG. 9, the extruder 2 starts discharging rubber 9 at the molding start position P4, and the molding drum 3 starts rotating substantially at the same time. In this manner, the rubber 9 discharged from the die 21 starts to be attached to the molding surface 3s. The rubber 9 discharged from the die 21 passes through a clearance between the die 21 and the molding surface 3s, so that a rubber member having the desired thickness t is molded.

As described above, the rubber member molding method according to the present embodiment is a rubber member molding method for molding a rubber member having a belt shape by attaching the rubber 9 discharged from the die 21 to the molding surface 3s while relatively moving the die 21 and the molding surface 3s in the direction along the molding surface 3s. Before the start of molding, a position where the die 21 is moved in a direction of moving closer to the molding surface 3s and abuts on the molding surface 3s is set as the abutting position P3, and a position where the die 21 is moved in a direction of moving away from the molding surface 3s by the desired thickness t of a rubber member at the start of molding from the abutting position P3 is set as the molding start position P4.

According to this configuration, since the die 21 is separated from the molding surface 3s by the desired thickness t of a rubber member at the start of molding from the abutting position P3 at which the die 21 actually abuts on the molding surface 3s as a starting point, a clearance between the die 21 and the molding surface 3s can be set with high accuracy so as to have the desired thickness t of the rubber member.

In the rubber member molding method according to the present embodiment, the abutting position P3 is a position where the molding surface 3s is slightly displaced after the die 21 starts to be in contact with the molding surface 3s and while the die 21 is in a contact state.

According to this configuration, the position where the die 21 actually abuts on the molding surface 3s can be accurately set to the abutting position P3.

In the rubber member molding method according to the present embodiment, the slight displacement is measured by a contact sensor that measures displacement of the molding surface 3s.

According to this configuration, the slight displacement of the molding surface 3s can be reliably measured.

As described above, the rubber member molding device according to the present embodiment is the rubber member molding device 1 that molds a rubber member having a belt shape. The rubber member molding device 1 includes the die 21 that discharges the rubber 9, the molding surface 3s to which the rubber 9 discharged from the die 21 is attached while moving relative to the die 21, the moving mechanism 4 that moves the die 21 closer to or away from the molding surface 3s, the sensor 6 that detects that the die 21 moves closer to and abuts on the molding surface 3s, and the control device 7 that controls the moving mechanism 4. The control device 7 moves the die 21 closer to the molding surface 3s before the start of molding, and when receiving an abutment detection signal from the sensor 6, the control device 7 separates the die 21 from the molding surface 3s by the desired thickness t of a rubber member at the start of molding from the abutting position P3 at which the die 21 abuts on the molding surface 3s.

According to this configuration, since the die 21 is separated from the molding surface 3s by the desired thickness t of a rubber member at the start of molding from the abutting position P3 at which the die 21 actually abuts on the molding surface 3s as a starting point, a clearance between the die 21 and the molding surface 3s can be set with high accuracy so as to have the desired thickness t of the rubber member.

Further, in the rubber member molding device 1 according to the present embodiment, the sensor 6 is a contact sensor that measures displacement of the molding surface 3s.

According to this configuration, the sensor 6 can reliably measure slight displacement of the molding surface 3s.

In the rubber member molding device 1 according to the present embodiment, the sensor 6 is arranged behind the molding surface 3s as viewed from the die 21.

According to this configuration, the sensor 6 can reliably measure slight displacement of the molding surface 3s displaced by the die 21.

In the rubber member molding device 1 according to the present embodiment, the sensor 6 is arranged on an extension line in a direction in which the die 21 moves closer to the molding surface 3s.

According to this configuration, since a displacement direction of the molding drum 3 and the direction of the sensor 6 are opposed to each other, a highly reliable contact type sensor can be used as the sensor 6.

The molding drum 3 according to the present embodiment includes the molding surface 3s having a cylindrical shape to which the rubber 9 discharged from the die 21 is attached, the motor 5 that rotates the molding surface 3s about a cylindrical axis, and the sensor 6 that detects that the die 21 moves closer to and abuts on the molding surface 3s. According to this configuration, it is possible to detect that the die 21 actually abuts on the molding surface 3s.

The program according to the present embodiment causes a computer to execute the rubber member molding method described above. It is also possible to obtain a function and an effect of the above method by executing the program. In other words, it can be said that the above method is used.

Although the embodiment of the present disclosure has been described above with reference to the drawings, it should be considered that the specific configuration is not limited to the embodiment. The scope of the present disclosure is shown not only by the above description of the embodiment but also by the claims, and further includes all modifications within the meanings and the scope, which are equivalent to those in the claims.

It is possible to employ the structure employed in each of the above embodiments in any other embodiment. The specific configuration of each of the portions is not limited to the above-described embodiments, and various modifications are possible without departing from the spirit of the present disclosure.

For example, execution order of each processing such as operation, procedures, steps, and stages in the device, program, and method shown in the claims, the description, and the drawings can be realized in any order unless output of earlier processing is used in later processing. Even if a process in the claims, the description, and the drawings is described using "first", "next", and the like for convenience, it does not mean that it is essential to execute the process in this order.

In the rubber member molding method according to the above embodiment, before the start of molding, a position where the die 21 is moved in a direction of moving closer to the molding surface 3s and abuts on the molding surface 3s is set as the abutting position P3, and a position where the die 21 is moved in a direction of moving away from the molding surface 3s by the desired thickness t of a rubber member at the start of molding from the abutting position P3 is set as the molding start position P4. However, the rubber member molding method is not limited to such a configuration. For example, the molding surface 3s may be moved closer to and away from the die 21. That is, the configuration may be such that, before the start of molding, the position where the molding surface 3s is moved in a direction of moving closer to the die 21 and abuts on the die 21 is set as the abutting position, and a position where the molding surface 3s is moved in a direction of moving away from the die 21 by the desired thickness t of a rubber member at the start of molding from the abutting position is set as the molding start position. At this time, the sensor 6 measures displacement of the die 21.

In the rubber member molding method and the rubber member molding device according to the above embodiment, the molding drum 3 includes a plurality of the segments 30 arranged along the circumferential direction, but the present invention is not limited to this. The molding drum 3 may not be divided into segments and may be configured integrally.

In the rubber member molding method and the rubber member molding device according to the embodiment, the molding surface is the molding surface 3s having a cylindrical shape of the molding drum 3, but the present invention is not limited to this. The molding surface may be a disk-shaped molding surface of a rotating disk.

What is claimed is:

1. A rubber member molding method for molding a rubber member having a belt shape by attaching rubber discharged from a die to a molding surface while relatively moving the die and the molding surface in a direction along the molding surface, the rubber member molding method comprising:

setting, as an abutting position, a position where a first one of the die and the molding surface is moved in a direction of moving closer to a second one and abuts on the second one before start of molding, and setting, as a molding start position, a position where the first one is moved from the abutting position in a direction of moving away from the second one by a desired thickness of a rubber member at the start of molding, before setting the abutting position, moving a sensor that detects that the first one moves closer to and abuts on the second one forward until the sensor contacts the molding surface, and when the sensor contacts the molding surface, stopping the sensor and setting a detection value of the sensor at this stop position to a zero point of the sensor.

2. The rubber member molding method according to claim 1, wherein the abutting position is a position where the second one is slightly displaced after the first one of the die and the molding surface starts to be in contact with the second one and while the first one is in a contact state.

3. The rubber member molding method according to claim 2, wherein the slight displacement is measured by a contact sensor that measures displacement of the second one of the die and the molding surface.

4. The rubber member molding method according to claim 1, wherein the sensor is a contact sensor that measures displacement of the second one.

5. The rubber member molding method according to claim 1, wherein the sensor is arranged behind the second one as viewed from the first one.

* * * * *